United States Patent
Taylor et al.

(12)

(10) Patent No.: US 6,443,277 B1
(45) Date of Patent: Sep. 3, 2002

(54) CLUTCH VALVING CIRCUIT FOR AUTOMATIC TRANSMISSION

(75) Inventors: Joel A. Taylor, Burton; David Allen Blenc, Shelby Township, Macomb County, both of MI (US); Robert Charles Downs, La Jolla; James Kevin Mainquist, San Diego, both of CA (US); Goro Tamai, Warren; Kyle Kenneth Kinsey, Fenton, both of MI (US)

(73) Assignee: General Motors Corporation, Detroit, MI (US)

( * ) Notice: Subject to any disclaimer, the term of this patent is extended or adjusted under 35 U.S.C. 154(b) by 13 days.

(21) Appl. No.: 09/661,774

(22) Filed: Sep. 14, 2000

(51) Int. Cl.$^7$ ................................................. B60K 41/22
(52) U.S. Cl. ..................... 192/3.57; 192/3.58; 192/3.62; 192/85 R
(58) Field of Search ................................ 192/3.57, 3.58, 192/3.62, 85 R, 101; 74/473.11, 473.19, 473.3; 180/65.2, 65.7

(56) References Cited

U.S. PATENT DOCUMENTS 6,093,974 A * 7/2000 Tabata et al. ............. 290/40 R

* cited by examiner

Primary Examiner—Richard M. Lorence
(74) Attorney, Agent, or Firm—Leslie C. Hodges

(57) ABSTRACT

A first clutch circuit for an automatic transmission in a hybrid drive vehicle comprises an apply line extending from a manual valve to a clutch, with a check ball disposed in the apply line operable to move out of the apply line upon upstream fluid pressure, and an exhaust line extending from the apply line, downstream of the check ball, to an exhaust valve. A driver-triggered valve actuating means operates to close the exhaust valve when the driver selects drive with a driver shift lever and to open the exhaust valve when the driver shifts out of drive thereby releasing the clutch.

6 Claims, 4 Drawing Sheets

CLUTCH VALVING CIRCUIT FOR AUTOMATIC TRANSMISSION

TECHNICAL FIELD

The present invention relates to a clutch valving circuit for an automatic transmission, particularly in a hybrid electric vehicle.

BACKGROUND OF THE INVENTION

A hybrid electric vehicle may be powered alternatively or simultaneously by an internal combustion engine and an electric motor to maximize fuel economy. The electric motor may be part of an electric machine, referred to herein as a motor-generator, which may replace the conventional starter motor and alternator. To move the vehicle from a stopped position, the motor-generator draws electrical energy from a battery pack to turn the engine crankshaft. As vehicle speed increases, fuel and spark are delivered to initiate engine operation. At a certain vehicle speed range, the motor-generator may operate as a generator driven by the engine crankshaft to recharge the battery pack and to supply electrical power to auxiliary vehicle devices such as fans, radios, etc.

When the vehicle is coasting or braking, fuel flow to the engine may be stopped to improve fuel economy. During fuel-off deceleration downshifts, the motor-generator may operate as a motor to synchronize engine and transmission speeds by increasing engine speed to permit a downshift. As the engine speed decreases to a point where engine compression pulsations would be perceived adversely by the driver, the transmission is shifted into a neutral gear to allow the engine to stall. When the engine crankshaft is no longer spinning, the transmission pump operatively associated with the crankshaft likewise does not spin and therefore does not develop hydraulic pressure. In a conventional first clutch circuit, flow thereto is controlled by a manual valve, operated by driver-input through a shift lever. If there is no apply pressure but the path through the manual valve is still open as the vehicle is still in drive, then the first clutch circuit exhausts therethrough. When the driver attempts to re-accelerate the vehicle, there is no apply pressure to activate the first gear clutch needed for the drive gear.

The need exists for a simple way to modify a transmission clutch circuit, designed to be used solely in conjunction with an internal combustion engine, to now be used with a hybrid power source with minimal hardware modifications. More particularly, in "drive" mode, the transmission clutch circuit must enable the first gear clutch to remain applied even when the engine crankshaft, and thus the transmission pump, are not rotating.

SUMMARY OF THE INVENTION

The present invention provides a first clutch valving circuit for an automatic transmission, particularly for use in a hybrid electric vehicle. The circuit operates to maintain the first gear clutch in an engaged state when the transmission is in drive, even when the transmission pump is not pressurizing the circuit. The first gear clutch is exhausted when the driver shifts out of drive.

The first clutch circuit comprises an apply line extending from a manual valve to the first gear clutch, with a check ball disposed in the apply line operable to move out of the apply line upon upstream fluid pressure, and an exhaust line extending from the apply line, downstream of the check ball, to an exhaust valve. When the exhaust valve is open, the clutch pressure is released. The check ball ensures that clutch pressure is maintained even when there is no pressure generated by the transmission pump.

A driver-triggered valve actuating means operates to close the exhaust valve when the driver selects drive with a driver shift lever and to open the exhaust valve when the driver shifts out of drive thereby releasing the clutch. The actuating means may be an electronic means such as an electronic signal from the driver shift lever to a solenoid operating on the exhaust valve. Preferably the actuating means may be a mechanical linkage between the driver shift lever and the exhaust valve.

One such mechanical valve actuating means comprises a rooster comb assembly including a rooster comb shaft rotatably operated on by the driver shift lever and a rooster comb fixedly mounted to one end of the rooster comb shaft for rotation therewith about a shaft axis and having a slotted window defined by a cam-shaped edge. The rooster comb assembly operates in conjunction with a gimbal. The gimbal is rotatable about a gimbal axis perpendicular to the shaft axis and includes a catching rod, extending through the slotted window in the rooster comb. The gimbal also includes a cammed actuating surface in close spatial adjacency with an actuating end of the exhaust valve. When a driver selects drive with the driver shift lever, the rooster comb rotates to a position corresponding to drive, the catching rod of the gimbal extends through the slotted window, and the cammed actuating surface of the gimbal does not displace the exhaust valve. Therefore the exhaust valve is in a closed state. When the driver shifts out of drive, the rooster comb rotates, displacing the slotted window wherein the cam-shaped edge of the window applies a force to the gimbal catching rod, rotating the gimbal such that the cammed actuating surface contacts and opens the exhaust valve to release the clutch.

DESCRIPTION OF THE PREFERRED EMBODIMENT

Figure 1:
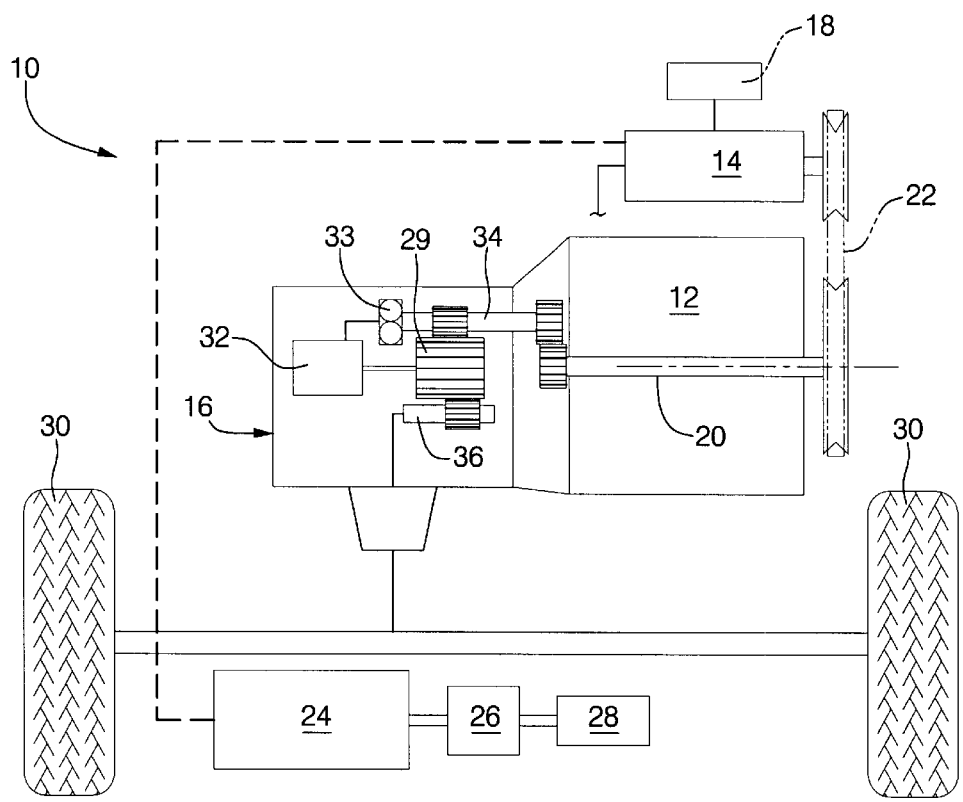
FIG. 1 is a schematic illustration of a hybrid vehicle drive system.

With reference to FIG. 1, a hybrid electric vehicle includes a hybrid drive system, shown generally as 10, having an internal combustion engine 12, an electric machine referred to herein as a motor-generator 14, and a multi-speed automatic transmission 16.

The electric motor-generator 14 of the hybrid drive system 10 has a stator and a rotor, both not shown, selectively controlled by controller 18. The rotor of the motor-generator is directly connected to the crankshaft 20 of the engine 12 such as via a direct drive mechanism 22 shown as a belt and pulley in FIG. 1, connected to the front end of the engine. This allows the motor-generator 14 to selectively operate as a starter motor in supplying a cranking torque to the crankshaft 20 and to operate as a generator by receiving rotational energy from the crankshaft and converting it to electrical energy for recharging an associated battery pack 24.

A DCDC converter 26 is provided to direct higher voltage charging power from the motor-generator 14 to a lower voltage vehicle accessory system 28 for powering accessories such as radios and fans during generator operation.

The transmission 16 of the vehicle drive system 10 is a well-known device including gear sets and friction devices 29 operable to provide a number of drive speed ratios between the engine 12 and vehicle drive wheels 30. A transmission hydraulic control circuit 32 with transmission pump 33 controls the gears 29 and is briefly described, although not illustrated in detail. In this particular application, when the driver selects drive with a shift lever, a manual valve delivers line pressure to the first clutch circuit to apply the first clutch. Application of the first clutch allows the transmission input shaft 34 to rotate a first speed drive and driven gear. During first speed drive operation a sprang clutch connects the first speed driven gear to the output shaft. During first speed vehicle deceleration, the sprang clutch allows slippage or overrun. Therefore reduced engine speed does not provide a braking effect through the transmission 16 to the drive wheels 30, and the drive wheels behave as though the transmission is in neutral gear. In second, third, and fourth speeds, the first clutch is still applied, connecting the input shaft 34 to the drive gear, but the sprang clutch does not transfer load to the output shaft 36. The appropriate speed clutch transfers load to the output shaft during both drive and coast operation, providing engine braking during coasting. In park, reverse, and neutral, the first clutch circuit is not pressurized through the manual valve.

A general control and operating sequence for the hybrid drive system 10 is described next. Initial vehicle key-up is analogous to that of a conventionally powered vehicle. The driver turns the ignition key to the crank state, wherein the controller 18 signals the motor-generator 14 to draw electrical energy from the battery pack 24. The motor-generator 14 transfers torque to the engine crankshaft 20 via the belt drive 22 to crank the engine 12.

Above a certain engine speed while the engine 12 is operating, the motor-generator 14 may operate as a generator due to the rotational input from the crankshaft 20 to recharge the battery pack 24 and power the vehicle accessory system 28.

When the driver applies the brake pedal or does not apply the gas pedal during an extended coast, fuel delivery to the engine 12 may stop to conserve fuel. To balance driver-felt smoothness and fuel economy, the fuel may be cut off one cylinder at a time as the spark is ramped down. During fuel-off vehicle coasting, the controller 18 may reverse the motor-generator's polarity to direct charging current to the battery pack 24 and decelerate the vehicle by slowing the engine speed.

Further, during fuel-off deceleration downshifts, the motor-generator 14 may operate as a motor to synchronize engine and transmission speeds. Since the engine idle-air-control motor, which is conventionally used to match engine and transmission speeds, has no effect during fuel-off mode, the motor-generator 14 increases the engine speed for seamlessly releasing the higher gear clutch and engaging the lower gear clutch. Downshifts ensure the transmission 16 is in the proper gear for re-acceleration. If the driver demands acceleration after the engine speed has dropped below a minimum reference, the motor-generator 14 may again act as a motor to turn the crankshaft 20, in conjunction with fuel delivery, to restart combustion in the spinning engine 12.

When the engine speed decreases below a certain speed where compression pulses may become objectionable to a driver, the controller 18 shifts the transmission 16 to an effectively neutral drive condition during vehicle deceleration, thereby stalling the engine 12. This so called "drop-to-neutral" speed is chosen to be as low as possible to improve drive ability. In this particular transmission configuration, the transmission 16 is shifted to first gear since the first sprang clutch freewheels during vehicle deceleration and the transmission responds as though it were in neutral gear. When the engine crankshaft 20 is no longer spinning, the transmission pump 33 operatively associated with the crankshaft likewise does not spin and therefore does not develop hydraulic pressure in the transmission control circuit 32.

The present invention ensures that when the driver attempts to re-accelerate the vehicle from a stopped engine and vehicle state that there is apply pressure activating the first gear clutch. Otherwise each vehicle launch from a traffic light would be like a so-called "garage shift", as though the transmission was shifted from neutral to first gear resulting in time lag and noise. The first clutch circuit arrangement and valving apparatus 40 illustrated in FIG. 2 maintains an activated first gear clutch under all operating conditions where the driver selects drive.

The first clutch circuit 42 comprises an apply line 44, a clutch 46, an exhaust line 48, and an exhaust valve 50. The apply line 44 extends from the manual valve 52 to the clutch 46. A check ball assembly 54 is disposed in the apply line 44. The check ball assembly 54 includes a spring 56 having a check ball 58 disposed at one end, where the natural state of the spring places the check ball in a position where it divides the apply line 44 into two segments, a first apply segment 60 upstream of the check ball and a second apply segment 62 downstream of the check ball. The check ball assembly 54 operates to block the path from the manual valve 52 to the clutch 46 unless the first apply segment 60 is pressurized. The exhaust line 48 extends from the apply line 44, and more particularly from the second apply segment 62 upstream of the clutch 46, to the exhaust valve 50.

Figure 3:
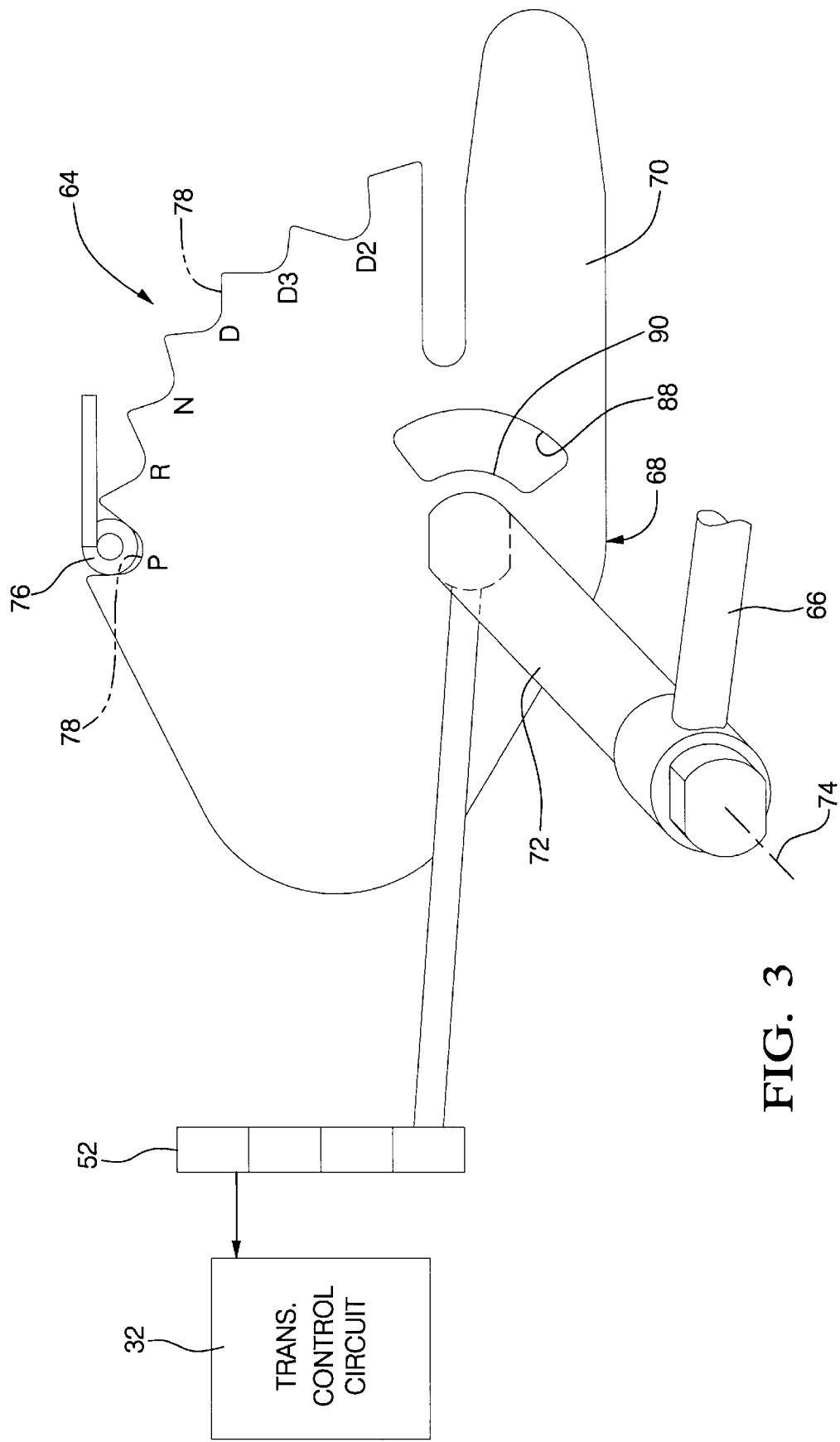
FIG. 3 is a schematic illustration of a manual control assembly for controlling a manual valve of the transmission.

As shown schematically in FIG. 3, the manual valve 52 is operated on by a manual control assembly 64. The manual control assembly 64 includes a driver-operated shift lever 66 in the interior of the vehicle and a rooster comb assembly 68. The conventional rooster comb assembly 68 includes a rooster comb 70 fixedly mounted to one end of a shaft 72, and is rotatable therewith about the shaft axis 74. It is known that when the driver shifts gears by the shift lever 66, the rooster shaft 72 and accordingly the rooster comb 70 rotate about the shaft axis 74. As the rooster comb 70 rotates, a spring loaded detent roller 76 falls into a notch 78 of the rooster comb corresponding to the gear selected. Rotation of the rooster comb 70 moves the manual valve 52 axially to the selected gear. When the manual valve 52 is in drive, the transmission pump 33 supplies hydraulic fluid, regulated to a given feed pressure, to the first clutch circuit 42 upon actuation of the manual valve.

Figure 2:
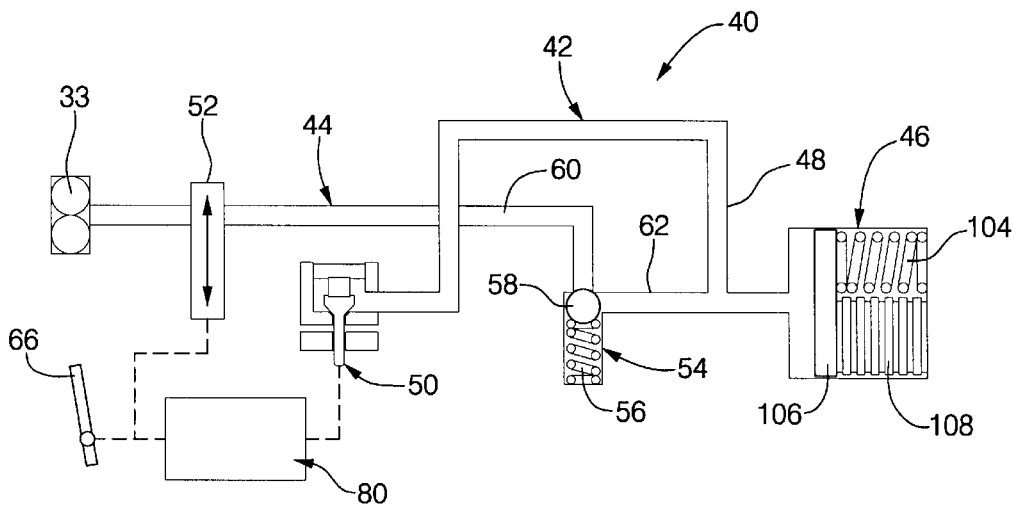
FIG. 2 is a schematic illustration of a first clutch circuit of the present invention for use in the automatic transmission of the hybrid vehicle drive system of FIG. 1.

When the manual valve 52 is shifted out of drive, the first clutch circuit 42 of FIG. 2 needs to be exhausted through the exhaust valve 50. The present invention includes a driver-triggered, exhaust valve actuating means 80. The actuating means 80 operatively links the exhaust valve 50 of the first clutch circuit 42 to the driver-operated shift lever 66 to actuate the exhaust valve based on whether the driver selects "drive" or not drive, meaning "park", "reverse", or "neutral".

Figure 6:
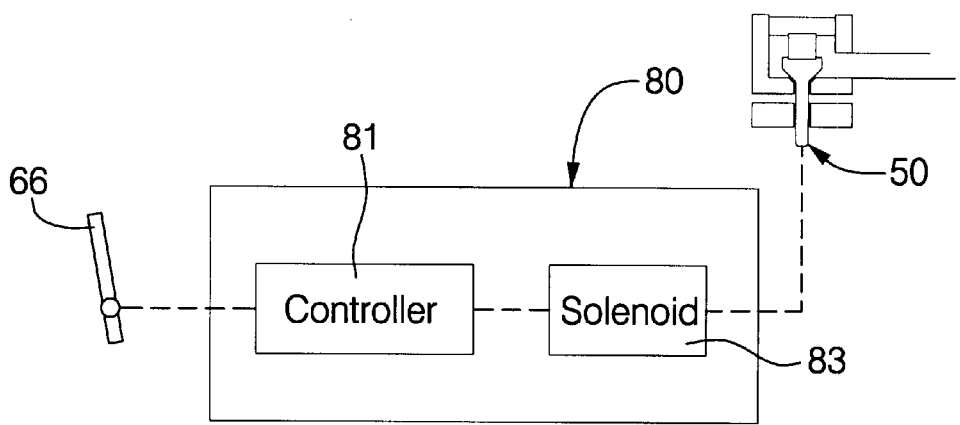
FIG. 6 is a schematic view of an exhaust valve actuating means.

The driver-triggered exhaust valve actuating means 80 may be electronic as illustrated in FIG. 6. Here moving the shift lever 66 into "drive" by the driver sends an electronic signal to a controller 81, which then delivers current to energize a solenoid 83 associated with the exhaust valve 50 to open the exhaust line 48.

Figure 4:
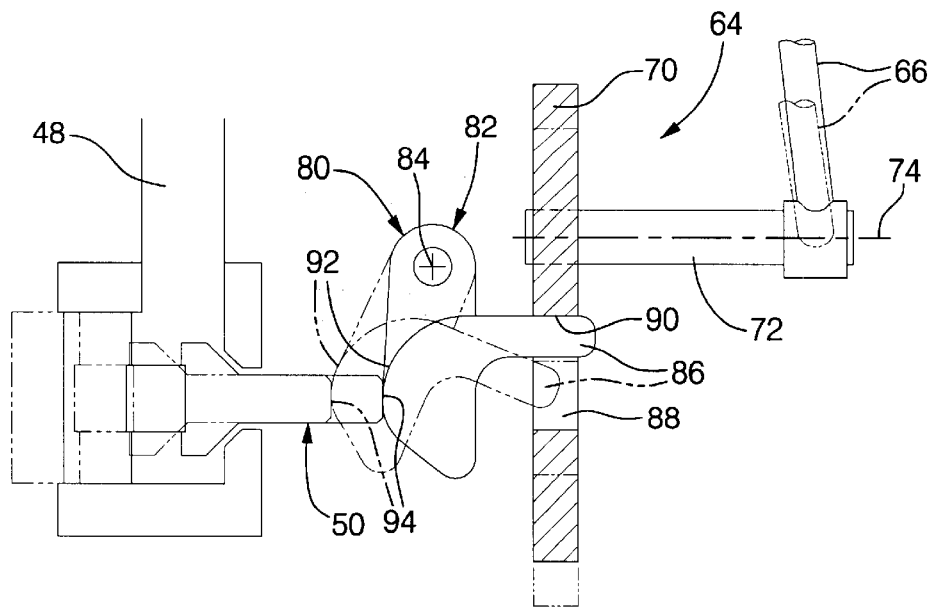
FIG. 4 is a schematic plan view of an exhaust valving apparatus for the first clutch circuit.

A preferred valve actuating means 80 is by a mechanical linkage between the driver shift lever 66 and the exhaust valve 50. As shown in FIG. 4, the valve actuating means 80 includes a gimbal 82 acting in conjunction with the manual control assembly 64 to link the driver shift lever 66 to the exhaust valve 50. More particularly, the gimbal 82 is a component rotatable about a gimbal axis 84 perpendicular to the rooster shaft axis 74. The gimbal axis 84 is approximately parallel to the plane of the rooster comb 70. The gimbal 82 includes a catching rod 86, which extends through a slotted window 88 defined by a cam-shaped edge 90 in the rooster comb 70, whereupon certain rotations of the rooster comb, the cam-shaped edge 90 contacts the catching rod 86 to rotate the gimbal. The gimbal 82 further includes a cammed actuating surface 92, which is in close spatial adjacency or in contact with the actuating end 94 of the exhaust valve 50.

The gimbal 82 is so located relative to the rooster comb 70 and exhaust valve 50 such that when the rooster comb is in a position corresponding to "drive", the catching rod 86 of the gimbal extends through the slotted window 88 of the rooster comb. Further the cammed actuating surface 92 of the gimbal 82 does not displace the actuating end 94 of the exhaust valve 50, such that the exhaust valve is in a closed state. Therefore the first clutch 46 is pressurized and engaged. When the driver shifts out of "drive" to either park, reverse, or neutral, the rooster comb 70 rotates sufficiently for the slotted window 88 to be displaced and the cam-shaped edge 90 of the window to apply a force to the gimbal catching rod 86. The force rotates the gimbal 82 about the gimbal axis 84, which rotates the cammed actuating surface 92 into contact with the actuating end 94 of the exhaust valve 50 to apply an approximately axial force thereto. This opens the exhaust valve 50 and exhausts the first clutch circuit 42 so that the transmission may shift out of drive.

Figure 5:
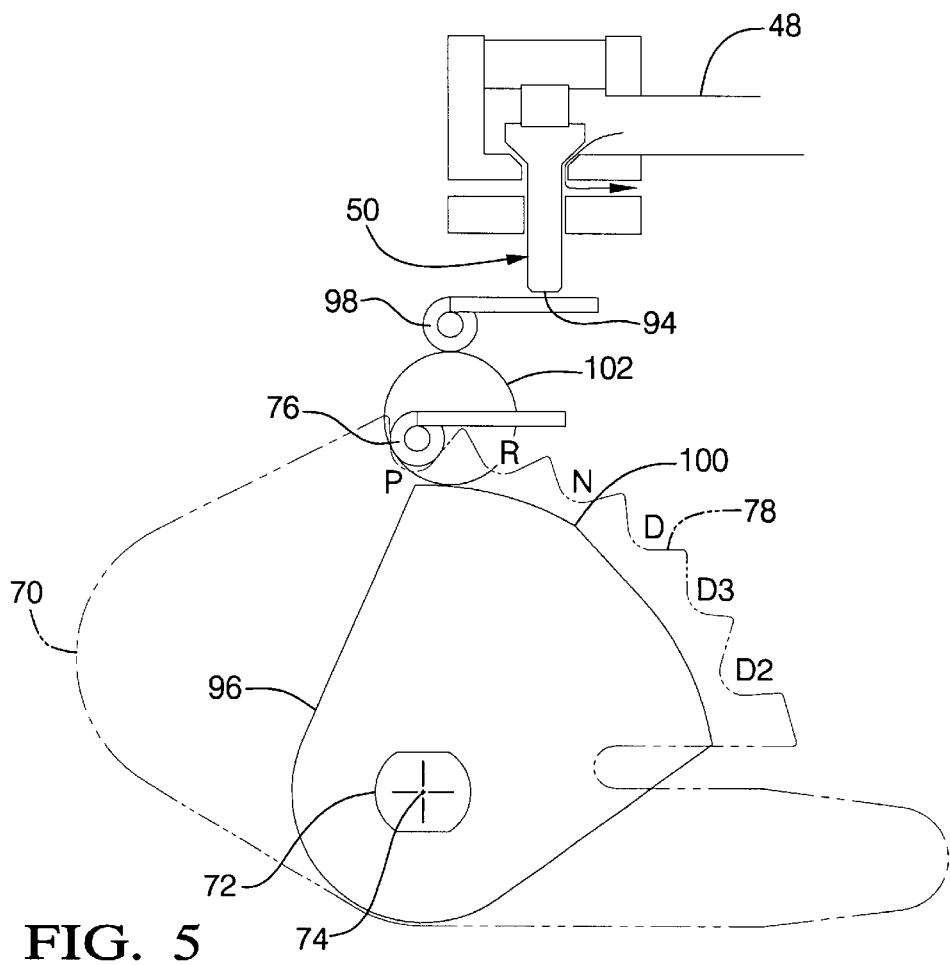
FIG. 5 is a schematic view of a second mechanical valve actuating means.

Another example of a mechanical linkage between the driver shift lever 66 and the exhaust valve 50, which operates as the driver-triggered exhaust valve actuating means 80, is shown schematically in FIG. 5. A camplate 96 is mounted to the rooster comb 70 and shaft 72 in parallel relation to rotate therewith. A roller follower 98 follows the cammed surface 100 of the camplate 96 via a spacer 102 disposed between the roller follower and the camplate. The roller follower 98 is provided in close spatial adjacency with the actuating end 94 of the exhaust valve 50. The cammed surface 100 of the camplate 96 is shaped such that when the rooster comb 70 is in park, reverse, or neutral, the roller follower 98 contacts the actuating end 94 of the exhaust valve 50 and lifts the valve open to exhaust the first clutch circuit 42. When the rooster comb 70 is in drive, the roller follower 98 does not contact the exhaust valve 50 and therefore the valve remains closed, and the first clutch remains applied.

Therefore in operation, when the driver shifts the driver shift lever 66 to "drive", the manual valve 52 is shifted to deliver pressurized hydraulic fluid to the apply line 44 of the first clutch circuit 42. The pressurized fluid in the apply line 44 is sufficient to compress the check ball spring 56 and displace the check ball 58 thereby putting the first and second segments of the apply line 60,62 in fluid communication. The fluid in the apply line 44 applies the clutch 46 in a conventional manner known in the art by compressing a clutch spring 104 and piston 106 to contact a clutch pack 108. The apply line fluid also fills the exhaust line 48 of the clutch circuit 42, which is closed by the exhaust valve 50. With this configuration clutch circuit 42, during a fuel-off and zero engine speed driving condition, when transmission pump operation is discontinued and pressurized fluid is no longer pumped into the first apply segment 60, the check ball 58 springs back to its natural state. The check ball 58 prevents back flow of the fluid from the second to the first apply segments 62,60, maintaining the clutch 46 in a pressurized, applied state even through there is no fluid pumped into the apply line 44 of the first clutch circuit 42.

The first clutch 46 is applied while in drive, but needs to be exhausted to shift out of drive. The first clutch circuit 42 is exhausted by the driver-triggered valve actuating means 80, which operatively links the driver shift lever 66 and the exhaust valve 50. The actuating means 80 may be a mechanical linkage or an electronically-actuated means.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A first clutch circuit for an automatic transmission in a hybrid drive vehicle, comprising:
    an apply line extending from a manual valve to a clutch, a check ball seated on a spring wherein said check ball is disposed in said apply line and operates to move out of said apply line by compressing said spring upon upstream fluid pressure applied to said check ball, an exhaust line extending from said apply line, downstream of said check ball, to an exhaust valve, and a driver-triggered valve actuating means for closing said exhaust valve when driver selects drive with a driver shift lever and for opening said exhaust valve when driver shifts out of drive thereby releasing said clutch.

2. A first clutch circuit, as defined in claim 1, wherein said driver-triggered valve actuating means includes a solenoid.

3. A first clutch circuit, as defined in claim 1, wherein said driver-triggered valve actuating means is a mechanical linkage between said driver shift lever and said exhaust valve.

4. A first clutch circuit, as defined in claim 3, wherein said driver-triggered valve actuating means comprises a rooster comb shaft rotatably operated on by said driver shift lever, a rooster comb fixedly mounted to one end of said rooster comb shaft for rotation therewith about a shaft axis and having a slotted window defined by a cam-shaped edge, and a gimbal rotatable about a gimbal axis perpendicular to said shaft axis and including a catching rod extending through said slotted window in said rooster comb, and a cammed actuating surface in close spatial adjacency with an actuating end of said exhaust valve, such that when said driver shift lever is in drive, said rooster comb is in a position corresponding to drive and said cammed actuating surface of said gimbal does not displace said exhaust valve, such that said exhaust valve is in a closed state and when the driver shifts out of drive, said rooster comb rotates, displacing said slotted window wherein said cam-shaped edge of said window applies a force to said gimbal catching rod, rotating said gimbal such that said cammed actuating surface contacts and opens said exhaust valve to release said clutch.

5. A first clutch circuit, as defined in claim 3, wherein said driver-triggered valve actuating means comprises a rooster comb shaft rotatably operated on by said driver shift lever, a rooster comb fixedly mounted to one end of said rooster comb shaft for rotation therewith about a shaft axis, a camplate mounted to rotate with said rooster comb having a cammed surface, a roller follower to follow the contour of said cammed surface of said camplate and in close spatial adjacency with an actuating end of said exhaust valve wherein when a driver selects drive with said driver shift lever, said rooster comb and said camplate rotate to a position corresponding to drive and said roller follower does not contact said actuating end of said exhaust valve, such that said exhaust valve is in a closed state and when the driver shifts out of drive, said rooster comb and camplate rotate, displacing said roller follower by said cammed surface to apply a force to said actuating end to open said exhaust valve and release said clutch.

6. A method of operating the first clutch circuit of claim 1, comprising the steps of:

delivering pressurized fluid to said clutch through said apply line, and closing said exhaust valve when drive is selected and a transmission pump is operating;

blocking said apply line by said check ball to prevent releasing of said clutch and maintaining said exhaust valve closed when drive is selected and said transmission pump is not operating; and opening said exhaust valve via said driver shift lever to release said clutch when drive deselected by the driver.

* * * * *